US008804664B2

(12) United States Patent
Jin

(10) Patent No.: US 8,804,664 B2
(45) Date of Patent: Aug. 12, 2014

(54) METHOD FOR SELECTIVELY PERFORMING HANDOFF ACCORDING TO SERVICE TYPE AND SYSTEM THEREOF

(75) Inventor: Sung-Il Jin, Seoul (KR)

(73) Assignee: KT Corporation, Gyeonggi-do (KR)

( * ) Notice: Subject to any disclaimer, the term of this patent is extended or adjusted under 35 U.S.C. 154(b) by 242 days.

(21) Appl. No.: 13/166,222

(22) Filed: Jun. 22, 2011

(65) Prior Publication Data

US 2011/0317660 A1 Dec. 29, 2011

(30) Foreign Application Priority Data

Jun. 24, 2010 (KR) ........................ 10-2010-0060101

(51) Int. Cl.
*H04W 4/00* (2009.01)
*H04W 36/00* (2009.01)
(52) U.S. Cl.
CPC ...... *H04W 36/0005* (2013.01); *H04W 36/0066* (2013.01)
USPC ............ 370/331; 370/332; 370/333; 370/334
(58) Field of Classification Search
USPC ........ 370/475, 432.1, 435.1, 435.2, 436, 437, 370/440, 442, 444, 331, 332, 333, 334, 465, 370/466, 467
See application file for complete search history.

(56) References Cited

U.S. PATENT DOCUMENTS

| | | | |
|---|---|---|---|
| 2006/0153124 A1* | 7/2006 | Kant et al. ..................... 370/328 |
| 2006/0245408 A1* | 11/2006 | Lee et al. ....................... 370/338 |
| 2006/0246903 A1* | 11/2006 | Kong et al. .................... 455/437 |
| 2007/0021127 A1* | 1/2007 | Zheng .......................... 455/456.1 |
| 2007/0025297 A1* | 2/2007 | Lee et al. ....................... 370/331 |
| 2007/0086383 A1* | 4/2007 | Watanabe et al. ............. 370/331 |
| 2007/0097862 A1* | 5/2007 | Moon et al. .................... 370/230 |
| 2007/0197221 A1* | 8/2007 | Ryu et al. .................... 455/435.2 |
| 2007/0208864 A1* | 9/2007 | Flynn et al. .................... 709/227 |
| 2008/0043674 A1* | 2/2008 | Suh et al. ....................... 370/331 |
| 2008/0123673 A1* | 5/2008 | Lee .............................. 370/412 |
| 2008/0146234 A1* | 6/2008 | Kim .............................. 455/437 |
| 2008/0159235 A1* | 7/2008 | Son et al. ...................... 370/332 |
| 2008/0186912 A1* | 8/2008 | Huomo ......................... 370/329 |
| 2008/0198804 A1* | 8/2008 | Rahman et al. ............... 370/331 |
| 2008/0225793 A1* | 9/2008 | Wang et al. ................... 370/331 |
| 2008/0233945 A1* | 9/2008 | Gummadi et al. .......... 455/422.1 |
| 2008/0233958 A1* | 9/2008 | Robbins et al. ............... 455/436 |
| 2009/0080382 A1* | 3/2009 | Chen et al. .................... 370/331 |
| 2009/0111471 A1* | 4/2009 | Li et al. ......................... 455/437 |
| 2009/0168754 A1* | 7/2009 | Shan ............................ 370/352 |
| 2009/0257400 A1* | 10/2009 | Perras .......................... 370/331 |
| 2009/0280812 A1* | 11/2009 | Cheng et al. .................. 455/436 |
| 2009/0316660 A1* | 12/2009 | Perkins et al. ................ 370/332 |
| 2010/0128708 A1* | 5/2010 | Liu et al. ....................... 370/338 |
| 2010/0268583 A1* | 10/2010 | Backman .................... 705/14.4 |

(Continued)

*Primary Examiner* — Ian N Moore
*Assistant Examiner* — Phong La
(74) *Attorney, Agent, or Firm* — IP Legal Services, LLC

(57) ABSTRACT

Provided are a method for selectively performing a handoff according to a service type, and a system thereof. A home agent provides a target service to a user equipment through a mobile network channel of a mobile network. The user equipment detects entering a wireless access zone of a wireless data network while receiving the target service through the mobile network channel and determines a service type of the target service. The user equipment performs a handoff from the mobile network to the wireless data network in cooperation with the home agent when the service type is a non real-time service and refrains from performing a handoff when the service type is a real-time service.

11 Claims, 4 Drawing Sheets

(56) References Cited

U.S. PATENT DOCUMENTS

| | | | |
|---|---|---|---|
| 2010/0284365 A1* | 11/2010 | Sundell et al. | 370/331 |
| 2010/0296483 A1* | 11/2010 | Sayeedi et al. | 370/331 |
| 2010/0322188 A1* | 12/2010 | Nagatake et al. | 370/331 |
| 2010/0323696 A1* | 12/2010 | Cherian et al. | 455/435.2 |
| 2011/0007632 A1* | 1/2011 | Turanyi et al. | 370/235 |
| 2011/0040886 A1* | 2/2011 | Khalil et al. | 709/228 |
| 2011/0096749 A1* | 4/2011 | Rune | 370/331 |
| 2011/0103349 A1* | 5/2011 | Choi et al. | 370/331 |
| 2011/0171953 A1* | 7/2011 | Faccin et al. | 455/426.1 |
| 2011/0208877 A1* | 8/2011 | Ikeda et al. | 709/238 |
| 2011/0255511 A1* | 10/2011 | Ikeda | 370/331 |
| 2012/0282929 A1* | 11/2012 | Persson et al. | 455/436 |

* cited by examiner

METHOD FOR SELECTIVELY PERFORMING HANDOFF ACCORDING TO SERVICE TYPE AND SYSTEM THEREOF

CROSS REFERENCE TO PRIOR APPLICATIONS

The present application claims priority under 35 U.S.C. §119 to Korean Patent Application No. 10-2010-0060101 (filed on Jun. 24, 2010), which is hereby incorporated by reference in its entirety.

FIELD OF THE INVENTION

Apparatuses and methods consistent with embodiments of the present invention relate to selectively performing handoff according to a service type, and more particularly, to seamlessly providing a real-time service to user equipment when the user equipment enters a wireless access zone.

BACKGROUND OF THE INVENTION

Seamless handoff between heterogeneous networks is a process of transferring a data session from one access network connected to a core network to another without interruption of a related service. In order to implement the seamless handoff between heterogeneous networks, IP mobility technology has been applied based on a coverage area of a wireless access zone or a policy thereof. Lately, many seamless handoff methods have been introduced. However, these seamless handoff methods do not consider properties of services that are provided over the networks.

Since the properties of services have not been considered, problems may arise during handoff. For example, a voice over Internet Protocol (VoIP) service is a real-time service and very sensitive to interruption and delay. If handoff is performed without considering the real-time property of VoIP service, the quality of the VoIP service may be seriously deteriorated due to interruption or delay occurring during the handoff.

SUMMARY OF THE INVENTION

Embodiments of the present invention overcome the above disadvantages and other disadvantages not described above. Also, the present invention is not required to overcome the disadvantages described above, and an embodiment of the present invention may not overcome any of the problems described above.

In accordance with embodiments of the present invention, a handoff is selectively performed according to a service type.

In accordance with embodiments of the present invention, a real-time service is seamlessly provided to user equipment when the user equipment enters a wireless access zone. In embodiments of the present invention, a service is classified into a real-time service and a non real-time service. In the case of a real-time service, handoff from a mobile network to a wireless data network is controlled so as not to be performed when the user equipment enters a wireless access zone such as a WiFi zone, a WiMAX zone or a WiBro zone.

In accordance with a further embodiment of the present invention, a real-time service is seamlessly provided to user equipment when the user equipment enters a shadow area of a mobile network in a wireless access zone. In embodiments of the present invention, handoff is performed from a mobile network to a wireless data network when the user equipment enters a shadow area of the mobile network within a wireless access zone. After the handoff, binding between a mobile network channel of the mobile network and the user equipment is maintained although the user equipment begins receiving the real-time service through a wireless network channel of the wireless data network. When the user equipment leaves the shadow area, the real-time service is seamlessly provided to the user equipment again from the mobile network without performing another handoff from the wireless data network back to the mobile network.

In accordance with embodiments of the present invention, a system may selectively perform handoff according to a service type. The system may include user equipment, a gateway GPRS support node (GGSN), an access control router, and a home agent. The user equipment may set an access point name based on a service type of a target service that the user equipment wants to receive, form a mobile network channel through a mobile network and a wireless network channel through a wireless data network, and perform handoff from the mobile network to the wireless data network according to the service type of the target service received when the user equipment enters a wireless access zone. The gateway GPRS support node may form the mobile network channel by interworking with the user equipment, determine the service type of the target service based on the access point name from the user equipment, and set a real-time flag and a simultaneous binding request based on the determined service type.

The access control router may form the wireless network channel by interworking with the user equipment, determine the service type of the target service based on the access point name from the user equipment, and set a real-time flag and a simultaneous binding request based on the determined service type. The home agent may receive the real-time flag and the simultaneous binding request from at least one of the gateway GPRS support node and the access control router, analyze the real-time flag and the simultaneous binding request, set bindings for forming the mobile network channel to the user equipment through the gateway GPRS support node and for forming the wireless network channel to the user equipment through the access control router based on the simultaneous binding request, and perform handoff in cooperation with the user equipment based on the real-time flag.

In accordance with embodiments of the present invention, the user equipment may perform a handoff from the mobile network to the wireless data network when the service type of the target service is a non real-time service and refrain from performing a handoff from the mobile network to the wireless data network when the service type of the target service a real-time service.

The user equipment may perform the handoff from the mobile network to the wireless data network regardless of the service type when the user equipment enters a shadow area of the mobile network within the wireless access zone.

The mobile network may be a third generation mobile network including a wideband code division multiple access (WCDMA) network, the wireless data network may include any of a WiFi network, a WiMAX network, and a WiBro network, and the wireless access zone may include any of a WiFi zone, a WiMAX zone, and a WiBro zone.

The real-time service may include a voice over IP (VoIP) service, and the non real-time service may include a video on demand (VOD) service.

The gateway GPRS support node and the access control router may set the real-time flag and the simultaneous binding request to ON when the service type of the target service is a real-time service and transmit the real-time flag and the simultaneous binding request to the home agent using a PMIP binding request message. The gateway GPRS support node and the access control router may set the real-time flag to OFF when the service type of the target service is a non-real time service and transmit the real-time flag to the home agent using the PMIP binding request message.

The home agent may receive the PMIP binding request message, analyze the real-time flag and the simultaneous binding request in the PMIP binding request message, and manage the bindings for the mobile network channel and the wireless network channel according to the simultaneous binding request.

When the simultaneous binding request is set to ON, the home agent may maintain the binding for the mobile network channel and transfer data for the target service through the mobile network channel after the handoff is performed from the mobile network to the wireless data network, as the user equipment enters a shadow area of the mobile network.

Then the user equipment leaves the shadow area, because the binding is maintained for the mobile network channel, the user equipment may seamlessly receive the transfer data for the target service through the mobile network channel without performing a handoff from the wireless data network to the mobile network.

The system in accordance with embodiments of the present invention may further include a serving GPRS support node and a radio access station.

The serving GPRS support node may receive the access point name from the user equipment, select a corresponding gateway GPRS support node based on the access point name, and relay the access point name to the gateway GPRS support node using a create PDP context request message.

The radio access station may receive the access point name from the user equipment, and relay the access point name to the access control router using a DHCP request message.

The user equipment may transmit an active PDP context request message to the serving GPRS support node for transmitting the access point name to the serving GPRS support node.

The user equipment may transmit a DHCP request message with a real-time info flag to the radio access station, and the radio access station relays the real-time info flag to the access control router.

In accordance with another embodiment of the present invention, there is provided a method of selectively performing handoff according to a service type in a system including user equipment, a gateway GPRS support node, an access control router, and a home agent. The user equipment informs the home agent of the service type of a target service that the user equipment wants to receive through the gateway GPRS support node. The home agent forms a mobile network channel to the user equipment through a mobile network in cooperation with the gateway GPRS support node and provides the target service to the user equipment through the mobile network channel. The user equipment detects entering a wireless access zone while receiving the target service through the mobile network channel and determines the service type of the target service. The user equipment performs handoff from the mobile network to the wireless data network in cooperation with the home agent when the service type is a non real-time service and does not perform the handoff when the service type is a real-time service.

In performing the handoff, when the service type is the non real-time service, the home agent may form a wireless network channel through the wireless data network to the user equipment in cooperation with the access control router and receive the target service through the wireless network channel.

In performing the handoff, the user equipment may perform the handoff from the mobile network to the wireless data network regardless of the service type when the user equipment enters a shadow area of the mobile network within the wireless access zone.

In informing the home agent of the service type, the user equipment may set an access point name based on the service type of the target service and transmit the access point name to the gateway GPRS support node. The user equipment may set a real-time info flag based on the service type of the target service and transmit the real-time info flag to the access control router. The gateway GPRS support node and the access control router may set a real-time flag and a simultaneous binding request to ON when the service type of the target service is the real-time service and transmit the real-time flag and the simultaneous binding request to the home agent using a PMIP binding request message. The gateway GPRS support node and the access control router may set the real-time flag to OFF when the service type of the target service is a non-real time service and transmit the real-time flag to the home agent using the PMIP binding request message.

In forming the mobile network channel, the home agent may receive the PMIP binding request message, analyze the real-time flag and the simultaneous binding request in the PMIP binding request message, and set binding for the mobile network channel and for the wireless network channel according to the simultaneous binding request.

When the simultaneous binding request is set to ON, the home agent may maintain the binding for the mobile network channel and continuously transfers data for the target service through the mobile network channel after the handoff is performed from the mobile network to the wireless data network while the user equipment is within the shadow area of the mobile network.

When the user equipment leaves the shadow area, the user equipment seamlessly receives the target service through the mobile network channel without having to perform another handoff from the wireless data network back to the mobile network.

The mobile network may be a third generation mobile network including a wideband code division multiple access (WCDMA) network, the wireless data network may include any of a WiFi network, a WiMAX network, and a WiBro network, and the wireless access zone may include any of a WiFi zone, a WiMAX zone, and a WiBro zone.

The real-time service may include a voice over IP (VoIP) service, and the non real-time service may include a video on demand (VOD) service.

The access point name may be transmitted from the user equipment to a serving GPRS support node (SGSN). The serving GPRS support node may select a corresponding gateway GPRS support node based on the access point name and relay the access point name to the gateway GPRS support node using a create PDP context request message. The user equipment may set a real-time info flag according to the service type for a wireless data network. The real-time info flag may be transmitted to a radio access station, and the radio access station may relay the real-time info flag to the access control router using a DHCP request message.

The user equipment may transmit an active PDP context request message to the serving GPRS support node for transmitting the access point name to the serving GPRS support node. The user equipment may transmit a real-time info flag using a DHCP request message to the radio access station. The radio access station may relay the real-time info flag to the access control router.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Figure 1:
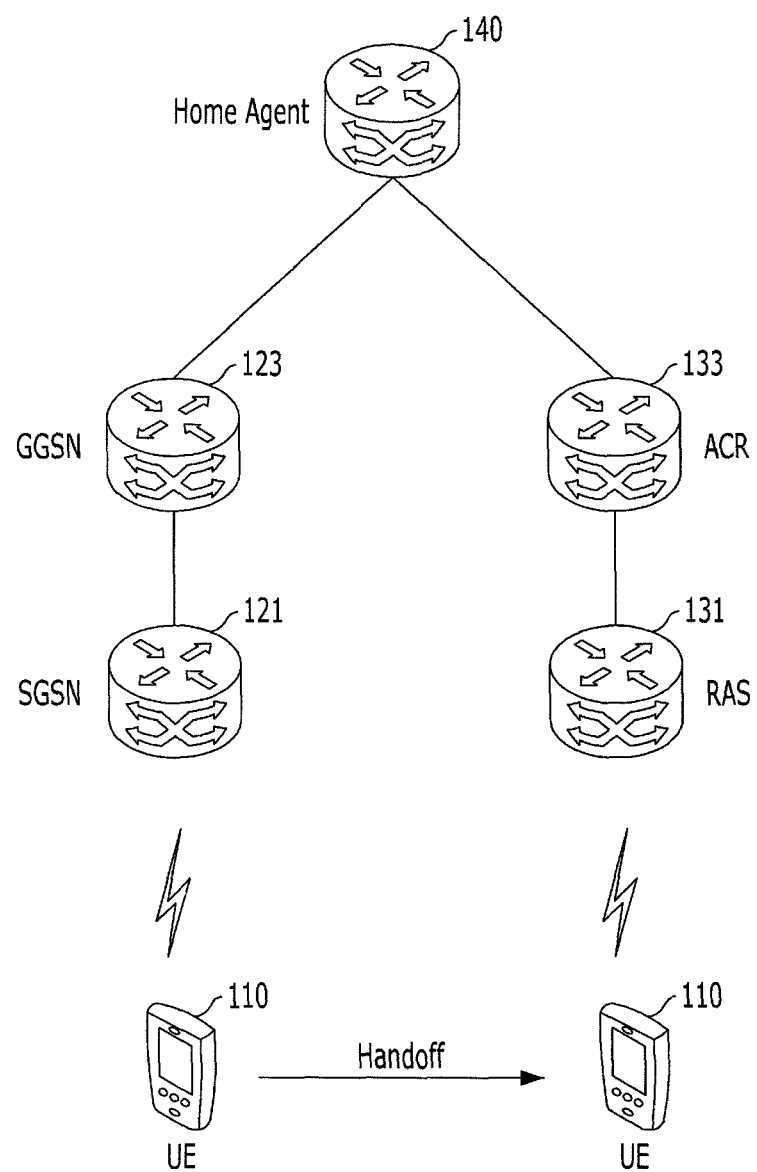
FIG. 1 illustrates a system for selectively performing handoff according to a service type of a service that a user equipment receives, in accordance with embodiments of the present invention.

Reference will now be made in detail to embodiments of the present invention, examples of which are illustrated in the accompanying drawings, wherein like reference numerals refer to like elements throughout. The embodiments are described below, in order to explain the present invention by referring to the figures.

FIG. 1 illustrates a system for selectively performing handoff according to a type of a service that a user equipment receives, in accordance with embodiments of the present invention.

Referring to FIG. 1, the system may include a home agent (HA) 140, a service GPRS support node (SGSN) 121, a gateway GPRS support node (GGSN) 123, a radio access station (RAS) 131, an access control router (ACR) 133, and user equipment (UE) 110. The user equipment 110 may receive a service, such as a PMIP based service but is not limited thereto, through two access networks: a mobile network and a wireless data network. The PMIP based service denotes a service provided based on Proxy Mobile IP (PMIP). The PMIP based service may be classified into a real-time service and a non real-time service. For example, the real-time service may be a Voice over IP (VoIP) service and the non real-time service may be a video on demand (VOD) service. The mobile network may be a third generation (3G) mobile network such as a wideband code division multiple access (WCDMA) network. The wireless data network may be a wireless local area network such as a WiFi network, a WiMAX network, or a WiBro network. When the user equipment 110 receives the PMIP based service through the mobile network, a mobile network channel may be formed between the home agent 140 and the user equipment 110 through the SGSN 121 and the GGSN 123. Further, when the user equipment 110 receives the PMIP based service through the wireless data network such as a WiFi network, a WiMAX network, or a WiBro network, a wireless network channel may be formed between the home agent 140 and the user equipment 110 through the RAS 131 and the ACR 133.

In a typical system, user equipment may conduct handoff from a mobile network to a wireless data network regardless of a service type when the user equipment enters a wireless access zone. For example, when the user equipment on the mobile network, for example, a WCDMA network, enters a wireless data network, for example, a WiBro zone of a WiBro network, while receiving a PMIP based service such as a VoIP service or a VOD service, the user equipment performs a handoff from the WCDMA network to the WiBro network regardless of a type of the PMIP based service.

Unlike the typical system, the system in accordance with embodiments of the present invention would selectively perform handoff from the mobile network to the WiBro network according to a type of a PMIP based service that the user equipment 110 receives. For example, in accordance with embodiments of the present invention, the system does not perform handoff from the mobile network to the WiBro network if the user equipment 110 is receiving a real-time service such as a VoIP service. The system in accordance with embodiments of the present invention performs a handoff from the mobile network to the WiBro network when the user equipment 110 is receiving a non real-time service such as a VOD service.

Furthermore, the system in accordance with embodiments of the present invention may perform the handoff from the mobile network to the wireless data network regardless of the service type when the user equipment enters a shadow area of the mobile network within the wireless access zone. In this case, the system maintains binding for the mobile network channel from the home agent 140 to the user equipment 110 through the SGSN 121 and the GGSN 123 although the user equipment 110 receives the PMIP based service through the wireless network channel after performing the handoff. The home agent 140 transmits data for the PMIP based service through the mobile network channel as well as through the wireless network channel after the handoff. Accordingly, the PMIP based service can seamlessly be provided to the user equipment 110 when the user equipment 110 leaves the shadow area or the WiBro zone. Furthermore, it may not be necessary for the user equipment 110 to perform another handoff from the WiBro network back to the mobile network when the user equipment leaves the shadow area of the WiBro zone because the binding for the mobile network channel is maintained as described above.

Hereinafter, the constituent elements of the system in accordance with embodiments of the present invention will be described in more detail. As described above, the system in accordance with embodiments of the present invention may include a home agent (HA) 140, a service GPRS support node (SGSN) 121, a gateway GPRS support node (GGSN) 123, a radio access station (RAS) 131, an access control router (ACR) 133, and user equipment (UE) 110.

The user equipment 110 may be a device that allows a user access to network services. The user equipment 110 may form a mobile network channel or a wireless network channel to receive a PMIP based service such as a VoIP service or a VOD service.

While forming the mobile network channel, the user equipment 110 may inform the SGSN 121 of a service type. The service type may be a real-time service or a non real-time service. In order to inform the SGSN 121, the user equipment 110 may set an access point name (APN) based on a corresponding PMIP based service in an active PDP context request message. The user equipment 110 may transmit the active PDP context request message with the APN to the SGSN 121. The APN may define a communication network and a service type. The APN may include two parts, a network identifier and an operator identifier. The network identifier may define an external network to which the GGSN 123 is connected. The network identifier may optionally define a service requested by the user equipment 110. The network identifier of the APN may be used to inform the SGSN 121 of a service type.

The user equipment 110 may also form the wireless network channel to receive a PMIP based service. While forming the wireless network channel, the user equipment 110 informs the radio access station (RAS) 131 of the service type. In order to inform the RAS 131, the user equipment 110 sets a real-time info flag corresponding to the service type and transmits a DHCP request message with the real-time info flag to the RAS 131.

Furthermore, the user equipment 110 may perform handoff from a mobile network to a wireless data network when the user equipment 110 enters a wireless access zone or a shadow area of a mobile network. Unlike the typical handoff method, the user equipment 110 may selectively perform the handoff from the mobile network to the wireless data network according to the service type. In the case of a non real-time service such as a VOD service, the user equipment 110 performs the handoff from the mobile network to the wireless data network when the user equipment 110 enters a wireless access zone of the wireless data network such as a WiFi zone, WiMAX zone or a WiBro zone. In the case of a real-time service such as a VoIP service, the user equipment 110 does not perform the handoff from the mobile network to the wireless data network although the user equipment 110 enters a wireless access zone of the wireless data network, such as a WiFi zone, WiMAX zone or a WiBro zone. Real-time services are very sensitive to interruption and delay. The system in accordance with embodiments of the present invention prevents unnecessary handoff from the mobile network to the wireless data network in order to avoid interruption or delay in the real-time service. Accordingly, the real-time service may be provided with high quality and reliability.

The serving GPRS support node (SGSN) 121 is a network node that supports the use of a general packet radio service (GPRS). The SGSN 121 is responsible for the delivery of data packets from and to user equipment in its service area. In embodiments of the present invention, the SGSN 121 may receive the active PDP context request message with the APN from the user equipment 110. The SGSN 121 may detect the service type that the user equipment 110 receives based on the APN in the active PDP context request message.

The SGSN 121 may select a corresponding GGSN 123 based on a network identifier of the APN and create a session to the corresponding GGSN 123. The SGSN 121 may transmit a create PDP context request message to the corresponding GGSN 123 to inform the corresponding GGSN 123 of the service type that the user equipment receives.

The SGSN 121 may receive a create PDP context response message from the GGSN 123. The create PDP context response message may include an IP address of the user equipment 110, which is allocated by the home agent 140. The SGSN 121 may allocate the IP address to the user equipment 110.

The gateway GPRS support node (GGSN) 123 is a main component of a general packet radio service (GPRS) network. The GGSN 123 is responsible for interworking between the GPRS network and an external packet switched network. The GGSN 123 converts GPRS packets from the SGSN 121 into an appropriate packet data protocol (PDP) format and sends them out on the corresponding packet data network.

The GGSN 123 may receive the create PDP context request message from the SGSN 121 and determine the service type that the user equipment 110 receives based on the APN in the create PDP context request message. Based on the determination result, the GGSN 123 may set a real-time flag and a simultaneous binding request. The real-time flag and the simultaneous binding request may be predetermined fields in a PMIP binding request message. For example, when the service type is a real-time service, the GGSN 123 may set the real-time flag and the simultaneous binding request to ON. On the contrary, when the service type is a non real-time service, the GGSN 123 may set the real-time flag and the simultaneous binding request to OFF. The GGSN 123 may transmit the PMIP binding request message to the home agent 140 after setting the real-time flag and the simultaneous binding request.

The GGSN 123 may also receive the PMIP binding complete message from the home agent 140. Here, the PMIP binding complete message may include an IP address to be allocated to the user equipment 110. The GGSN 123 may transmit the PMIP binding complete message to the SGSN 121.

The home agent 140 may be a router on the home network of the user equipment 110. The home agent 140 maintains current location information such as IP information for user equipment. The home agent 140 may be a local mobility anchor in proxy mobility IP (PMIP).

The home agent 140 may receive the PMIP binding request message from the GGSN 123. The home agent 140 may analyze the real-time flag and the simultaneous binding request in the PMIP binding request message. Based on the analysis result, the home agent 140 may determine whether the user equipment 110 is receiving a real-time service or a non real-time service. For example, the home agent 140 may perform handoff from the mobile network to the wireless network in cooperation with the user equipment 110 when the real-time flag is set to OFF. The home agent 140, however, may not perform the handoff when the real-time flag is set to ON. Furthermore, the home agent 140 may decide whether to maintain binding for a mobile network channel after the handoff, based on the simultaneous binding request. For example, the home agent 140 may maintain the binding for the mobile network channel when the simultaneous binding request is set to ON. On the contrary, the home agent 140 may release the binding for the mobile network channel when the simultaneous binding request is set to OFF.

When the simultaneous biding request is set to ON, the home agent 140 may continuously transmit data for the service to the user equipment 110 through the mobile network channel after the handoff. That is, the home agent 140 may continuously provide the service through the mobile network channel although the user equipment 110 receives the service through the wireless data network channel after the handoff. Since the home agent 140 maintains the binding for the mobile network channel and continuously transmits the data for the service through the mobile network channel, the user equipment 110 can again receive the service seamlessly without performing a handoff from the wireless data network back to the mobile network when the user equipment 110 leaves the wireless network area or the shadow area. Accordingly, the home agent 140 may manage real-time flags and multiple bindings for user equipment and also process each session differently according to each service.

The home agent 140 may transmit a PMIP binding complete message to the GGSN 123 in response to the PMIP binding request message. The PMIP binding complete message may include an IP address to be allocated to the user equipment 110.

The radio access station (RAS) 131 is a network node that transmits data to and receives data from the user equipment 110 through a wireless interface in a wireless data network, such as a WiBro network. The RAS 131 may receive a DHCP request message with a real-time info flag from the user equipment 110. The RAS 131 transfers the real-time info flag to the ACR 133. The RAS 131 may authenticate the user equipment 110 in cooperation with the ACR 133.

The RAS 131 may receive a DHCP release request message from the user equipment 110 when the user equipment 110 leaves the wireless network area. The RAS 131 may relay the DHCP release request message to the ACR 133.

The RAS 131 may receive a DHCP response message from the ACR 133 and relay the DHCP response message to the user equipment 110. The DHCP response message may include an IP address to be allocated to the user equipment 110.

The access control router (ACR) 133 may control user equipment and radio access stations and rout IP packets in a wireless data network such as a WiBro network. In embodiments of the present invention, the ACR 133 may receive the DHCP request message with the real-time info flag from the RAS 131. The ACR 133 would then analyze the real-time info flag in the DHCP request message and determine a service type that the user equipment 110 receives. The ACR 133 may set a real-time flag and a simultaneous binding request in a PMIP binding request message based on the analysis result of the real-time info flag and transmit the PMIP binding request message to the home agent 140.

The ACR 133 may receive a PMIP binding response message from the home agent 140. The PMIP binding response message may include an IP address to be allocated to the user equipment 110. The ACR 133 may transmit a DHCP response message to the RAS 131 in response to the PMIP binding response message. The DHCP response message may include the IP address to be allocated to the user equipment 110.

Figure 2:
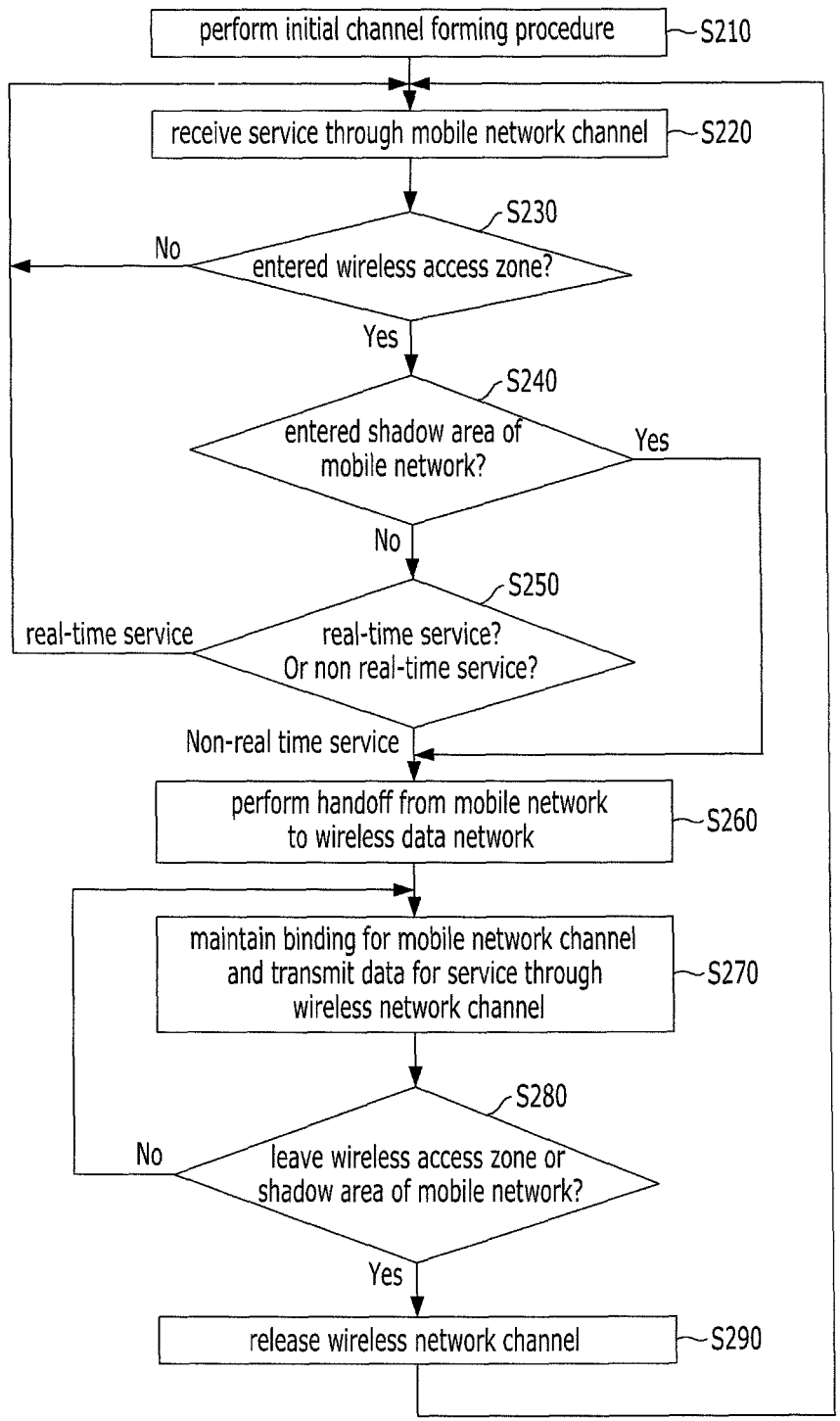
FIG. 2 illustrates a method for selectively performing handoff according to a service type, in accordance with embodiments of the present invention.

FIG. 2 is a flowchart illustrating a method for selectively performing handoff according to a service type of a PMIP based service in accordance with embodiments of the present invention.

Referring to FIG. 2, an initial channel forming procedure is performed S210. Particularly, the user equipment 110 may perform the initial channel forming procedure by forming, for example, a mobile network channel to a home agent 140 in order to receive a PMIP based service. The mobile network channel may be a channel formed through a third generation (3G) mobile network such as a wideband code division multiple access (WCDMA) network or a UMTS terrestrial radio access network (UTRAN). For example, the mobile network channel may be formed from the user equipment 110 to the home agent 140 through a service GPRS support node (SGSN) 121 and a gateway GPRS support node (GGSN) 123 as shown in FIG. 1. In performing the initial channel forming procedure S210, the user equipment 110 may inform the SGSN 121 of a service type of a PMIP based service that the user equipment 110 wants to receive. The user equipment 110 may use an access point name (APN) to inform the SGSN 121 of the service type. The APN may include information on a communication network and a service type. The APN may include two parts, a network identifier and an operator identifier. The network identifier may define an external network to which the GGSN 123 is connected. The network identifier may optionally define a service requested by the user equipment 110. In embodiments of the present invention, the network identifier of the APN may be used to inform the SGSN 121 of a service type. In the initial channel forming procedure, the GGSN 123 may inform the home agent 140 of the service type of the PMIP based service that the user equipment 110 wants to receive. In order to inform the home agent 140, the GGSN 123 may use a PMIP binding request message. For example, predetermined fields of the PMIP binding request message may be used as a real-time flag and a simultaneous binding request. The real-time flag and the simultaneous binding request may be set to ON when the request service is the real-time service such as a VoIP service. On the contrary, the real-time flag may be set to OFF when the request service is a non real-time service such as a VOD service. The initial channel forming procedure will be described in more detail with reference to FIG. 3.

After performing the initial channel forming procedure S210 so as to form, for example, the mobile network channel, a service such as the PMIP based service is received through the mobile network channel S220. The PMIP based service may be received by the user equipment 110.

Next, a determination is made as to whether the user equipment 110 has entered a wireless access zone or not S230. This determination may be made by the user equipment 110.

When it is determined that the user equipment 110 has entered a wireless access zone such as a WiBro zone, a WiMAX zone, or a WiFi zone (S230—Yes), it is then determined whether is the user equipment 110 has entered a shadow area of the mobile network or not S240. This determination may be made by the user equipment 110. The determination of having entered the wireless access zone as well as the determination as to whether the shadow area has been entered may be made by the user equipment 110. When it is determined that the user equipment 110 has entered the shadow area of the mobile network (S240—Yes), the user equipment 110 performs a handoff from the mobile network to the wireless data network regardless of the service type S260.

When it is determined that the user equipment 110 has not entered the shadow area (S240—No), a determination is made as to whether the received service is a non real-time service or a real-time service S250. This determination may be made by the user equipment 110. The non real-time service may be a VOD service and the real-time service may be a VoIP service.

When it is determined that the service received by the user equipment 110 is a real-time service such as a VoIP service S250, the user equipment 110 does not perform a handoff and continues to receive the service such as the PMIP based service through the mobile network channel S220.

When it is determined that the service received by the user equipment 110 is the non real-time service such as VOD service S250, the user equipment 110 performs a handoff from the mobile network to the wireless data network S260.

As a result of the handoff, the user equipment forms a wireless network channel to the home agent and continuously receives the service through the wireless network channel. The wireless network channel is a channel formed from the user equipment 110 to the home agent 140 through a radio access station (RAS) 131 and an access control router (ACR) 133 as shown in FIG. 1. In embodiments of the present invention, the home agent 140 does not disconnect the mobile network channel after forming the wireless network channel. The home agent 140 maintains binding for the mobile network channel and continuously transmits data for the service through the mobile network channel as well as the wireless network channel S270.

Next, a determination is made as to whether the user equipment 110 leaves the wireless data network or the shadow area of the mobile network S280. When the user equipment 110 is detected as leaving the wireless data network or the shadow area (S280—Yes), the user equipment 110 releases the wireless network channel S290 and continuously receives the service through the mobile network channel S220. When the user equipment 110 is detected as not leaving the wireless data network or the shadow area (S280—No), the home agent 140 maintains binding for the mobile network channel and continuously transmits data for the service through the mobile network channel as well as the wireless network channel S270.

Figure 3:
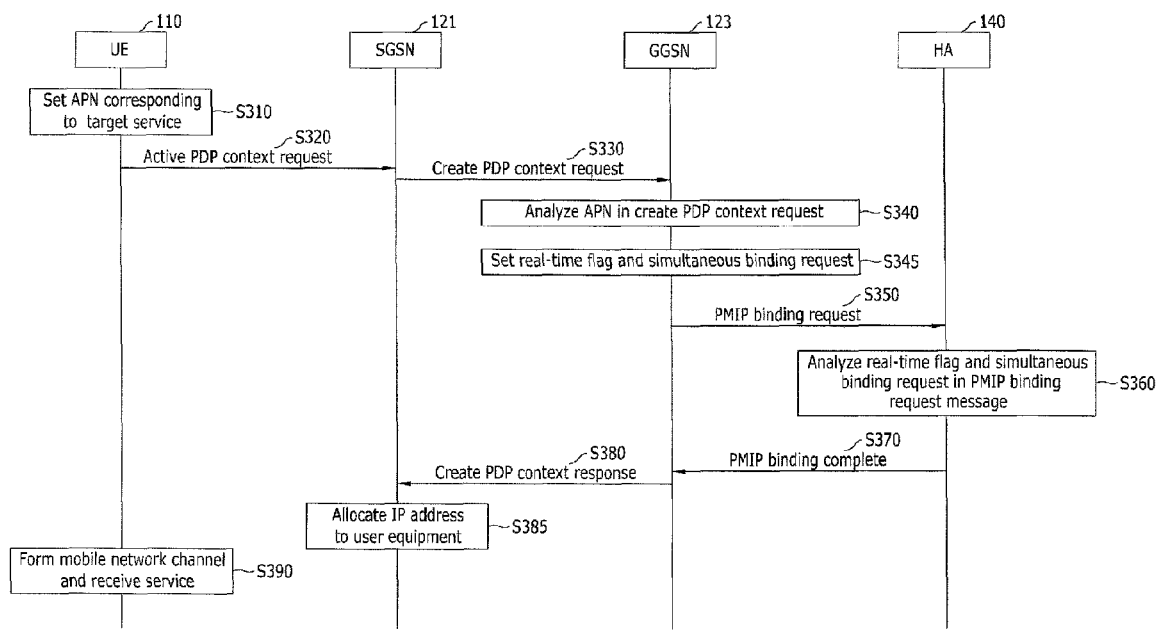
FIG. 3 illustrates in more detail the performing of the initial channel forming procedure of FIG. 2, in accordance with embodiments of the present invention.

FIG. 3 is a flowchart illustrating in more detail the performing of the initial channel forming procedure S210 of FIG. 2 in accordance with embodiments of the present invention.

Referring to FIG. 3, the user equipment 110 runs a predetermined application program in order to receive a PMIP based real-time service, such as a VoIP service, and sets an access point name (APN) corresponding to the predetermined real-time service in an active packet data protocol (PDP) context request message S310.

The user equipment 110 then accesses a SGSN 121 through a wireless interface and transmits the active PDP context request message having the APN to the SGSN 121 S320.

The SGSN 121 receives the active PDP context request message, selects a GGSN 123 corresponding to the APN in the active PDP context request message, and transmits a create PDP context request message to the GGSN 123 S330. For example, the APN may include a network identifier, such as "voip.co.kr." According to the network identifier, the SGSN 121 may select a GGSN 123 corresponding to "co.kr," and creates a session between the SGSN 121 and the selected GGSN 123 to receive a VoIP service.

The GGSN 123 receives the create PDP context request message from the SGSN 121 and analyzes the APN in the received create PDP context request message S340. Based on the analysis result, the GGSN 123 determines whether a current service that the user equipment wants to access is a real-time service or a non real-time service.

The GGSN 123 sets a real-time flag and a simultaneous binding request in a PMIP binding request message S345 based on the analysis result and transmits the PMIP binding request message to the home agent 140 S350. In embodiments of the present invention, the GGSN 123 sets a real-time flag to ON or OFF in order to inform the home agent 140 that a current service is a real-time service or a non real-time service. Furthermore, the simultaneous binding request is set to ON in order to receive a service simultaneously through a mobile network and a wireless data network when the user equipment 110 enters a shadow area of the mobile network. In the case of a real-time service such as a VoIP service, the GGSN 123 sets the real-time flag to ON and the simultaneous binding request to ON. In the case of a non real-time service, the GGSN 123 sets the real-time flag to OFF without setting the simultaneous binding request at S345.

The home agent 140 receives the PMIP binding request message and transmits a PMIP binding complete message to the GGSN 123 S370. In embodiments of the present invention, the home agent 140 analyzes the real-time flag and the simultaneous binding request in the PMIP binding request message S360. Based on the analysis result, the home agent 140 determines whether the user equipment 110 receives a real-time service or a non real-time service. Further, the home agent 140 decides to maintain binding for the mobile network channel although the handoff is performed from the mobile network to the wireless data network. Accordingly, the home agent 140 manages the real-time flag corresponding to each service and processes each session differently according to the corresponding service. The home agent 140 may manage multiple bindings for user equipment. The PMIP binding complete message may include an IP address allocated to the user equipment 110.

The GGSN 213 receives the PMIP binding complete message from the home agent 140 and transmits a create PDP context response message to the SGSN 121 S380. The create PDP context response message includes the IP address allocated to the user equipment 110.

The SGSN 121 receives the create PDP context response message and allocates the IP address in the PDP context response message to the user equipment 110 S385.

The user equipment 110 forms the mobile network channel to the home agent 140 and receives the PMIP based service through the mobile network channel S390.

Figure 4:
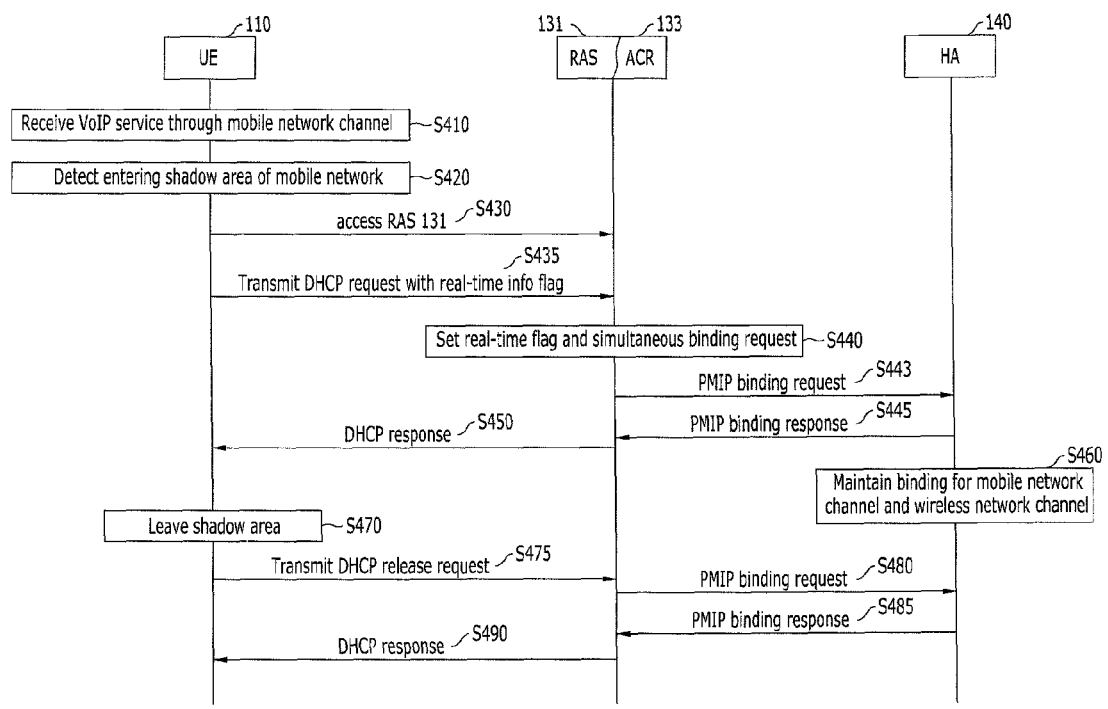
FIG. 4 illustrates in more detail the performing of the handoff from the mobile network to the wireless data network of FIG. 2, in accordance with embodiments of the present invention.

FIG. 4 is a flowchart illustrating in more detail the performing of the handoff from the mobile network to the wireless network S260 of FIG. 2, in accordance with embodiments of the present invention.

In embodiments of the present invention, user equipment performs handoff according to a service type of a PMIP based service. In the case of a real-time service such as a VoIP service, the user equipment may not perform a handoff from a mobile network to a wireless data network even when the user equipment enters a wireless access zone such as a WiFi zone, a WiMAX zone, or a WiBro zone. In the case of a non real-time service such as a VOD service, the user equipment may perform a handoff from the mobile network to the wireless data network when the user equipment enters the wireless access zone. Although the user equipment receives the real-time service, the user equipment performs a handoff from the mobile network to the wireless data network when the user equipment enters a shadow area or a 3G coverage hole of the mobile network. In this case, the home agent maintains binding for the mobile network channel and continuously transmits data for the related service through the mobile network channel.

For convenience and easy understanding, FIG. 4 illustrates a handoff from a mobile network to a WiBro network when user equipment enters a shadow area of the mobile network while receiving a VoIP service. However, it is understood that the handoff may be also made from a mobile network to a WiFi network or a WiMAX network.

The user equipment 110 receives a VoIP service through a mobile network channel formed between the user equipment 110 and the home agent 140 through the SGSN 121 and the GGSN 123 S410.

The user equipment 110 detects when it enters a shadow area of the mobile network within a wireless access zone S420. For example, when the user equipment 110 receives a signal having a signal strength lower than a predetermined level, the user equipment 110 may determine that it is entering the shadow area. In this case, the user equipment 110 may perform a handoff regardless of the service type.

The user equipment 110 accesses a radio access station (RAS) 131 of a WiBro network through a wireless interface S430 in order to perform a handoff from the mobile network to the WiBro network. The RAS 131 may authenticate the user equipment 110 in cooperation with the ACR 133.

The user equipment 110 informs the RAS 131 of a service type by setting a real-time info flag and transmitting a DHCP request message with the access point name to the RAS 131 S435. The RAS 131 receives the DHCP request message with the real-time info flag from the user equipment 110 and relays it to the ACR 133. The ACR 133 sets a real-time flag and a simultaneous binding request to ON based on the real-time info flag in the DHCP request message S440 and transmits a PMIP binding request message with the real-time flag and the simultaneous binding request to the home agent 140 S443.

The home agent 415 receives the PMIP binding request message from the ACR 133 and transmits a PMIP binding response message to the RAS 131 through the ACR 133 S445. Here, the PMIP binding response message may include an IP address to be allocated to the user equipment 110. The RAS 131 receives the PMIP binding response message from the home agent 140 through the ACR 133 and transmits a DHCP response message to the user equipment 110 S450. The DHCP response message includes the IP address to be allocated to the user equipment 110. The IP address is allocated to the user equipment 110 and a wireless network channel is formed between the user equipment 110 and the home agent 140 through the RAS 131 and the ACR 133. The home agent 140 maintains bindings for both the mobile network channel and the wireless network channel S460 after the handoff because the simultaneous binding request is set to ON. Accordingly, the home agent 140 may transfer data for the VoIP service not only through the mobile network channel but also through the wireless network channel.

When the user equipment 110 leaves the shadow area of the mobile network S470, the user equipment 110 may release the wireless network channel and reuse the mobile network channel to receive the VoIP service. In order to release the wireless network channel, the user equipment 110 transmits a DHCP release request message to the RAS 131 S475. The RAS 131 transmits a PMIP binding request message with a lifetime set as 0 to the home agent 140 through the ACR 133 S480.

The home agent 140 transmits a PMIP binding response message to the RAS 131 S485 in response to the PMIP binding request message received through the ACR 133. The RAS 131 then transmits a DHCP response message to the user equipment 110 to disconnect the wireless network channel S490.

As described above, the system and method in accordance with embodiments of the present invention selectively performs a handoff from the mobile network to the wireless data network according to the service type of the PMIP based service. Since properties of each service are considered when deciding whether to perform a handoff, a service quality can be improved and a real-time service can be provided with high reliability. Furthermore, network resources can be effectively utilized by preventing unnecessary handoff.

The method for selectively performing a handoff according to a service type of a PMIP based service in accordance with embodiments of the present invention may be realized as a program and stored in a computer-readable recording medium such as a CD-ROM, a RAM, a ROM, floppy disks, hard disks, magneto-optical disks, and the like.

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for handing off a communication session associated with a user equipment between heterogeneous networks including a first network and a second network, the method comprising:
   detecting the user equipment entering into one of second network access zones of the second network;
   determining a service type of the communication session associated with the user equipment; and
   controlling the handoff of the communication session from the first network to the second network so as not to be executed when the determined service type is a real-time service and maintaining a binding for the communication session associated with the first network when the determined service type is a real-time service,
   wherein the first network is a mobile network and the second network is a wireless data network, and wherein the handoff of the communication session from the mobile network to the wireless data network is controlled to always be executed regardless of the service type when the user equipment enters a shadow area of the mobile network, and receives a signal having a signal strength lower than a predetermined level;
   wherein the shadow area of the mobile network is within a wireless access zone of the wireless data network, and
   wherein the data of the communication session is received from the mobile network by the user equipment, without executing a handoff from the wireless data network to the mobile network, when the user equipment leaves the shadow area.

2. The method of claim 1, wherein the first network is a mobile network and the second network is a wireless data network.

3. The method of claim 2, wherein the mobile network is a third generation mobile
   network and the wireless data network comprises any one of a WiFi network, a WiMAX network, and a WiBro network.

4. The method of claim 1, wherein the handoff of the communication session from the first network to the second network is controlled so as to be executed when the determined service type is a non real-time service.

5. The method of claim 1, further comprising:
   maintaining a binding of a mobile network channel of the mobile network with the user equipment after the handoff of the communication session from the mobile network to the wireless data network is executed,
   wherein data of the communication session continues to be transmitted by the mobile network after the handoff.

6. A system for selectively executing a handoff, comprising:
   a user equipment configured to receive a communication session;
   a mobile network configured to transmit the communication session to the user equipment; and
   a wireless data network having a wireless access zone into which the user equipment enters,
   wherein the handoff of the communication session from the mobile network to the wireless data network is not executed when a service type of the communication session is a real-time service,
   wherein the handoff of the communication session from the mobile network to the wireless data network is always executed regardless of the service type when the user equipment enters a shadow area of the mobile network, and receives a signal having a signal strength lower than a predetermined level;
   wherein the shadow area of the mobile network is within a wireless access zone of the wireless data network, and
   wherein the data of the communication session is received from the mobile network by the user equipment, without executing a handoff from the wireless data network to the mobile network, when the user equipment leaves the shadow area.

7. The system of claim 6, wherein the handoff of the communication session from the mobile network to the wireless data network is executed when the determined service type is a non real-time service.

8. The system of claim 6, wherein the mobile network is a third generation mobile network and the wireless data network comprises any one of a WiFi network, a WiMAX network, and a WiBro network.

9. The system of claim 6, wherein a binding of a mobile network channel of the mobile network with the user equipment is maintained after the user equipment enters a shadow area of the mobile network and the handoff of the communication session from the mobile network to the wireless data network is executed, and wherein data of the communication session continues to be transmitted by the mobile network after the handoff.

10. A system for selectively executing a handoff, comprising:
 a user equipment configured to provide information pertaining to a service type of a communication service received in a communication session;
 a mobile network configured to transmit the communication service to the user equipment and set a real-time flag and a simultaneous binding request based on the information pertaining to the service type;
 wherein the handoff of the communication session from the mobile network to a wireless data network is not executed when the real-time flag is set as indicating the service type to be a real-time service,
 wherein the handoff of the communication session is initiated when the user equipment enters a shadow area of the mobile network within a wireless access zone of the wireless data network, and receives a signal having a signal strength lower than a predetermined level, in which case the handoff of the communication session is always executed regardless of the service type,
 wherein the shadow area of the mobile network is within a wireless access zone of the wireless data network, and
 wherein the data of the communication session is received from the mobile network by the user equipment, without executing a handoff from the wireless data network to the mobile network, when the user equipment leaves the shadow area.

11. The system of claim 10, wherein when the service type of the communication service received in the communication session is a real-time service, the simultaneous binding request is set to indicate the real-time service, a binding between the mobile network channel and the user equipment is maintained after the user equipment enters a shadow area of the mobile network and after the handoff of the communication session from the mobile network to the wireless data network is executed, and the communication service of the communication session continues to be transmitted by the mobile network after the handoff.

* * * * *